US005640413A

United States Patent [19]
Ichihara

[11] Patent Number: 5,640,413
[45] Date of Patent: Jun. 17, 1997

[54] DIGITAL MOBILE RADIO COMMUNICATION SYSTEM

[75] Inventor: Masaki Ichihara, Tokyo, Japan

[73] Assignee: NEC Corporation, Tokyo, Japan

[21] Appl. No.: 184,032

[22] Filed: Jan. 21, 1994

[30] Foreign Application Priority Data

Jan. 21, 1993 [JP] Japan ................. 5-008293

[51] Int. Cl.$^6$ .................................. H04L 27/30
[52] U.S. Cl. ........................................ 375/200
[58] Field of Search ........................................ 375/1

[56] References Cited

U.S. PATENT DOCUMENTS

| | | | |
|---|---|---|---|
| 5,184,347 | 2/1993 | Furwell et al. | 370/94.1 |
| 5,260,967 | 11/1993 | Schilling | 375/1 |
| 5,295,152 | 3/1994 | Gudmundson et al. | 375/1 |
| 5,319,634 | 6/1994 | Bartholomew et al. | 375/1 |
| 5,329,547 | 7/1994 | Ling | 375/1 |

FOREIGN PATENT DOCUMENTS

| | | |
|---|---|---|
| 64-84927 | 3/1989 | Japan . |
| 1-181336 | 7/1989 | Japan . |
| WO92/10891 | 6/1992 | WIPO . |

*Primary Examiner*—Salvatore Cangialosi
*Attorney, Agent, or Firm*—Young & Thompson

[57] ABSTRACT

A base station and a plurality of mobile stations are coupled by down and up radio communication lines. In base station, a spread spectrum signal is generated on the basis of a base station timing signal generated therein. In the mobile station, the spread spectrum signal transmitted from the base station is despread in spectrum by a mobile station timing signal. The mobile station timing signal is changed in generating timing to be determined by monitoring a despread spectrum signal as to whether an encoded data is observed or not therein.

2 Claims, 4 Drawing Sheets

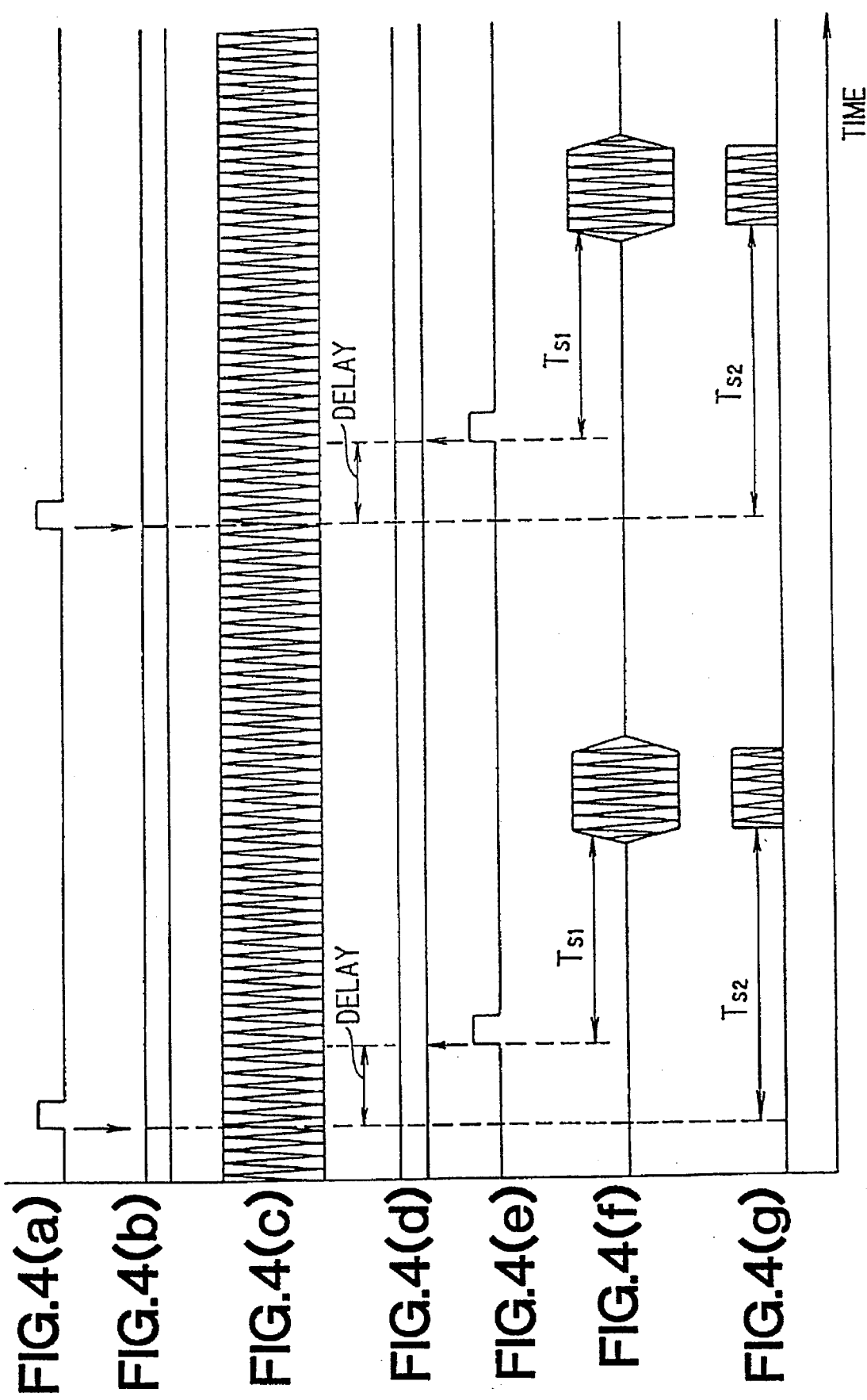

DIGITAL MOBILE RADIO COMMUNICATION SYSTEM

FIELD OF THE INVENTION

This invention relates to a digital mobile radio communication system, and more particularly to, a system using CDMA (Code Division Multiple Access) for the communication of a down line (link) between a base station and a mobile station selected among plural mobile station and TDMA (Time Division Multiple Access) for the communication of a up line (link) therebetween.

BACKGROUND OF THE INVENTION

In a conventional digital radio communication system, the TDMA method is used for the both communications of down and up lines between a base station and a mobile station selected from a plurality of mobile stations. The base station comprises a TDMA transmitter, a TDMA receiver, and a timing generator, and the mobile station comprises a TDMA receiver and a TDMA transmitter.

In operation, the timing generator of the base station generates a timing signal defining frames, and the TDMA transmitter of the base station transmits a high frequency transmitting signal having, for instance, six slots (bursts) to provide six channels via the down line to the mobile station, so that the TDMA receiver of the mobile station receives the burst signal corresponding to, for instance, the channel 2 in the transmitted high frequency signal, and the TDMA transmitter of the mobile station transmits a high frequency transmitting signal corresponding to the channel 2 at a specified time via the up line to the base station, after the TDMA receiver of the mobile station receives the transmitted signal. Then, the TDMA receiver of the base station receives the signal of the channel 2 transmitted from the base station at this specified time. In this operation, the synchronism is set up in accordance with the relation between the timing signal and the specified time.

In the conventional digital radio communication system, the synchronism in the communication between the base and mobile stations may be set up by using a method described in the Japanese Patent Kokai Nos. 64-84927 and 1-181336. In such a method, a transmitting time is controlled by calculating a communication distance between base and mobile stations, or in accordance with a time, at which a unique key word included in a received burst signal is detected.

Recently, the CDMA method utilizing spread spectrum technology is practically used in place of the TDMA method in digital mobile radio communication system. In this CDMA method, channels are defined by plural spread spectrum codes having no correlation with each other.

In case where this CDMA method is used for a down line, in which radio communication is carried out with complete synchronism, there are expected advantages set out below:

(a) it is possible to demodulate a received signal in a mobile station without interference among channels, and (b) the influence of multi-path fading is neglected substantially.

In case where the CDMA method is used for a up line, however, there are expected disadvantages set out below:

(a) the difference occurs in electric field strengths of received signals from mobile stations, because the distance between the base station and each selected mobile station among a plurality of mobile stations, so that communication is deteriorated between the base station and a mobile station having a long distance therefrom, although this is avoided by precisely controlling a transmitting power in the mobile station, and (b) there is difference in times, at which transmitting signals from mobile stations are received in the base station, so that it is difficult to set up the synchronism of spread spectrum code signals, thereby necessitating a complicated demodulation method.

In accordance with this study, it is considered that a mixed type of a digital mobile communication system in which the CDMA method is used for a down line, and the TDMA method is used for a up line is adopted to overcome the above disadvantages.

In the mixed type of a digital mobile radio communication system, however, there is a disadvantage in that a question as to how a timing for transmission of a transmitting burst signal of the TDMA method in a mobile station is determined is raised, because it is difficult for the mobile station to determine the timing by receiving a transmitted signal which is continuous in regard to time in the CDMA method.

SUMMARY OF THE INVENTION

Accordingly, it is an object of the invention to provide mixed type of a digital mobile radio communication system in which the synchronism of a TDMA burst transmitting signal for a up line can be set up without adding any synchronous signal to a CDMA signal transmitted a base station.

According to the invention, a digital mobile radio communication system, comprises:

a base station comprising a CDMA transmitter for transmitting a spread spectrum signal, a TDMA receiver for receiving a TDMA transmitted signal, and a timing generator for generating a base station timing signal; and a plurality of mobile stations each coupled via a down line and a up line to the base station, each of the mobile stations comprising a CDMA receiver for receiving the spread spectrum signal via the down line from the base station, a TDMA transmitter for transmitting a TDMA transmitting signal via the up line to the base station;

wherein the CDMA receiver comprises means for generating a mobile station timing signal in accordance with a despread spectrum signal obtained from the spread spectrum signal received in the CDMA receiver; and the TDMA transmitter operates in accordance with the mobile station timing signal.

In the digital mobile radio communication system, it is preferred that the CDMA transmitter comprises an encoder for encoding a transmitting data to provide a transmitting code signal, means for generating a spread spectrum code signal, a multiplier for multiplying the transmitting code signal and the spread spectrum code signal to provide the spread spectrum signal, and a RF modulator for modulating a high frequency signal by the spread spectrum signal to provide a base station high frequency transmitting signal; and the CDMA receiver comprises a RF demodulator for demodulating a mobile station received signal obtained by receiving the base station high frequency transmitting signal to provide a demodulated signal, means for generating a despread spectrum code signal, a multiplier for multiplying the demodulated signal and the despread spectrum code signal to provide a despread spectrum signal, and a decoder for decoding the despread spectrum signal to provide a received data, the despread spectrum code signal generating means being controlled in signal generating timing by the base station timing signal.

BRIEF DESCRIPTION OF THE DRAWINGS

The invention will be explained in more detailed in conjunction with appended drawings, wherein:

FIG. 4 is a timing chart showing operation in the system of the preferred embodiment.

DESCRIPTION OF THE PREFERRED EMBODIMENTS

Figure 1:
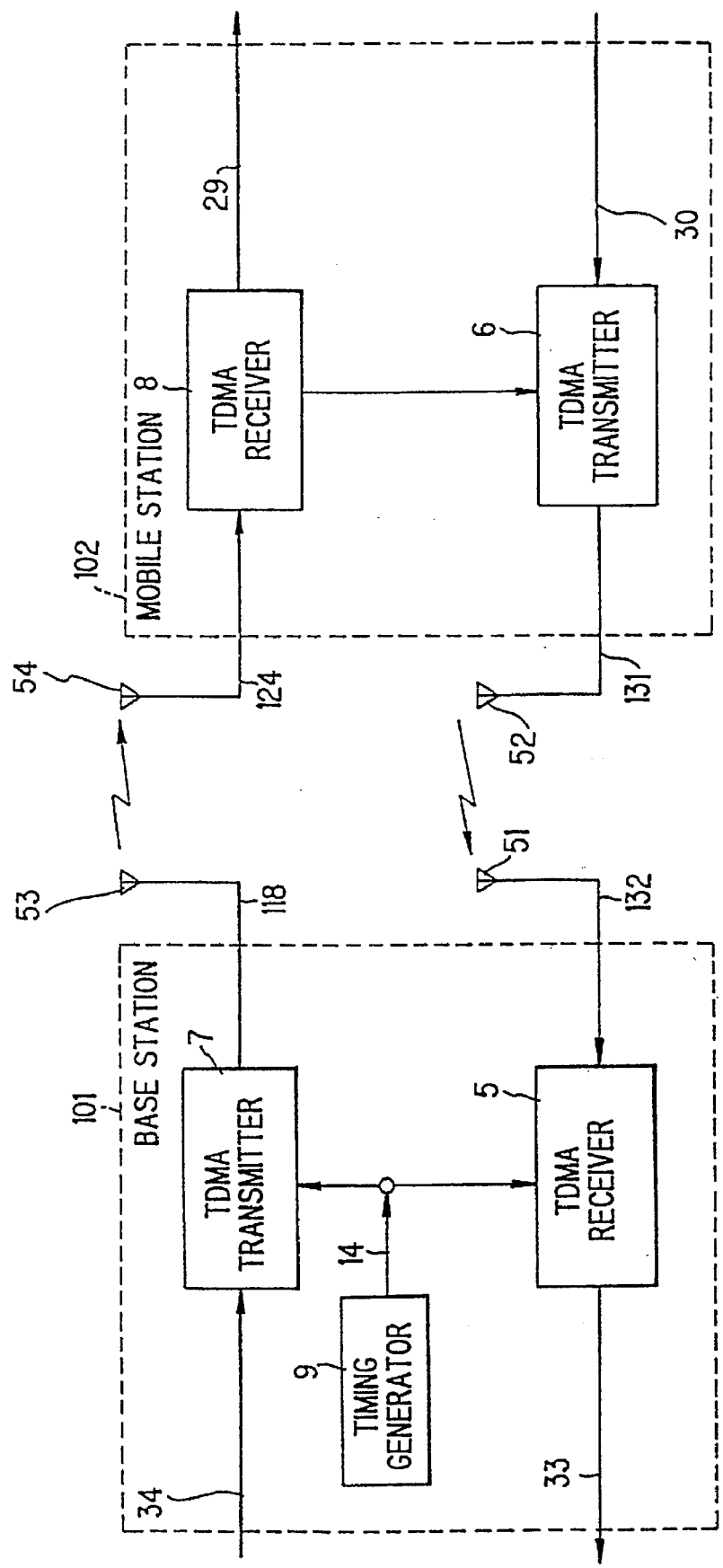
FIG. 1 is a block diagram showing a conventional digital mobile radio communication system using the TDMA method for both up and down lines.

Before explaining the digital mobile radio communication system of the preferred embodiment, the conventional digital mobile radio communication system will be again explained in FIG. 1.

FIG. 1 shows the conventional digital radio communication system which comprises a base (fixed) station 101 and a mobile station 102 connected by radio up and down lines. The base station 101 comprises a TDMA receiver 5, a TDMA transmitter 7, a timing generator 9, and antennas 51 and 53, and the mobile station 102 comprises a TDMA transmitter 6, a TDMA receiver 8, and antennas 52 and 54.

Figure 2:
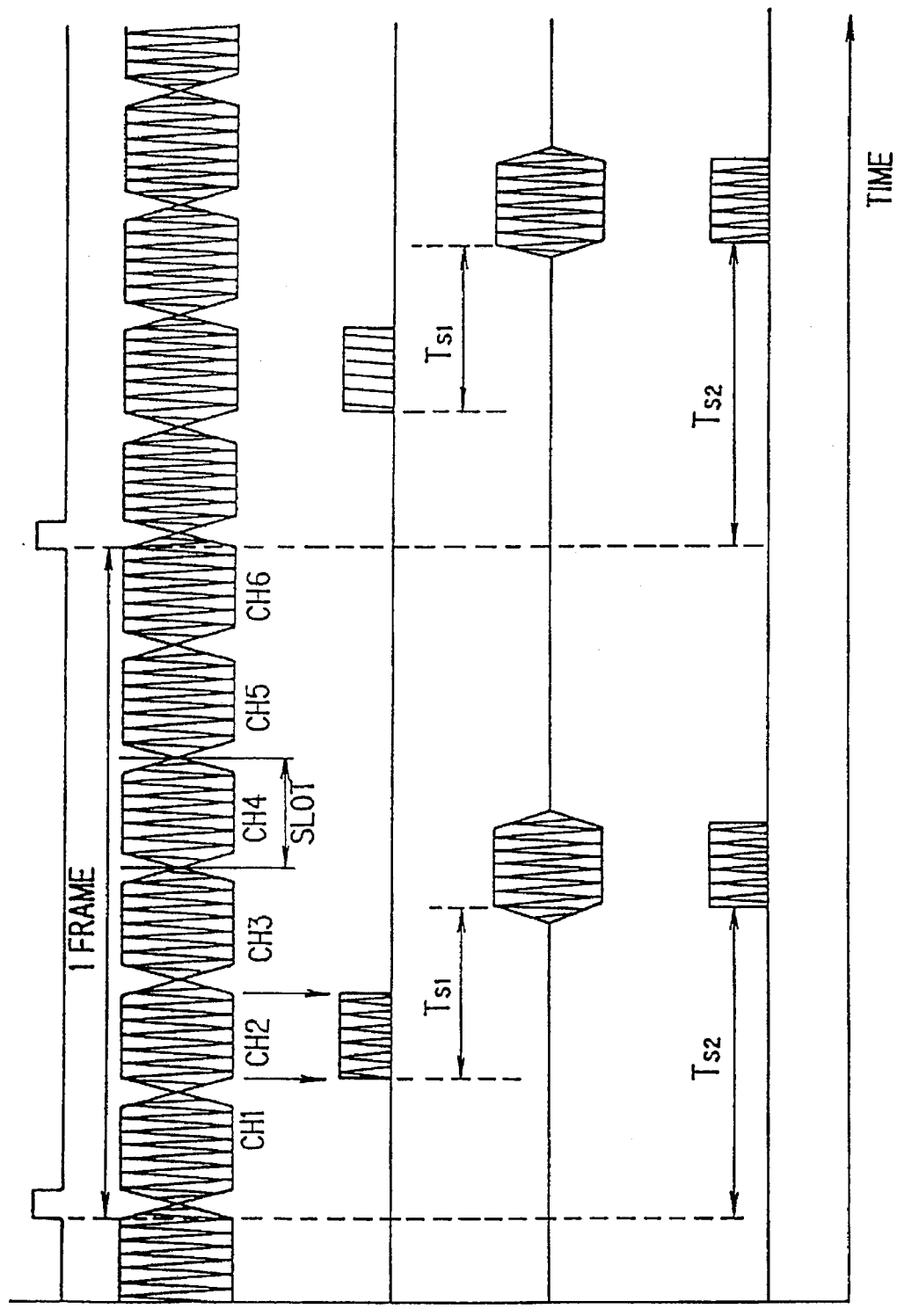
FIG. 2 is a timing chart showing operation in the conventional system shown in FIG. 1.

In operation, a timing signal 14 having a frame for a TDMA is generated in the timing generator of the base station 101 (FIG. 2(a)). In synchronism with the timing signal 14, a transmitting burst signal 118 having six bursts (slots) for six TDMA channels CH1 to CH6 is generated in the TDMA transmitter 7 of the base station 101 (FIG. 2(b)), and transmitted via the radio down line having the antennas 53 and 54 to the mobile station 102, so that, for instance, one burst for the channel CH2 of the burst signal 118 is accessed to be received in the TDMA receiver 8 of the mobile station 102 as a mobile station received signal 124 (FIG. 2(c)). Thus, the synchronism is set up between the base and mobile stations 101 and 102. Then, the TDMA transmitter 6 of the mobile station 102 generates a transmitting burst signal 131 in the TDMA channel CH2 to be transmitted via the radio up having the antennas 52 and 51 to the base station 101 on the basis of a prescribed time $T_{s1}$ (FIG. 2(d)). In the base station 101, the TDMA receiver 5 receives a transmitted burst signal 132 correctly in the channel CH2 in synchronism with the timing signal from the timing generator 9 in consideration of a prescribed time $T_{s2}$ (FIG. 2(e)).

In the base station 101, data 34 to be transmitted to the mobile station 102 is modulated in the TDMA transmitter 7, while data 33 is obtained by demodulating the received burst signal 132 in the TDMA receiver 5. In the same manner, data 29 is obtained by demodulating the received burst signal 124 in the TDMA receiver 8 in the mobile station 102, while data 30 to be transmitted to the base station 101 is modulated in the TDMA transmitter 6 to provide the transmitting burst signal 131.

Next, a digital mobile radio communication system which is of the aforementioned mixed type in a preferred embodiment according to the invention will be explained in FIGS. 3 and 4.

Figure 3:
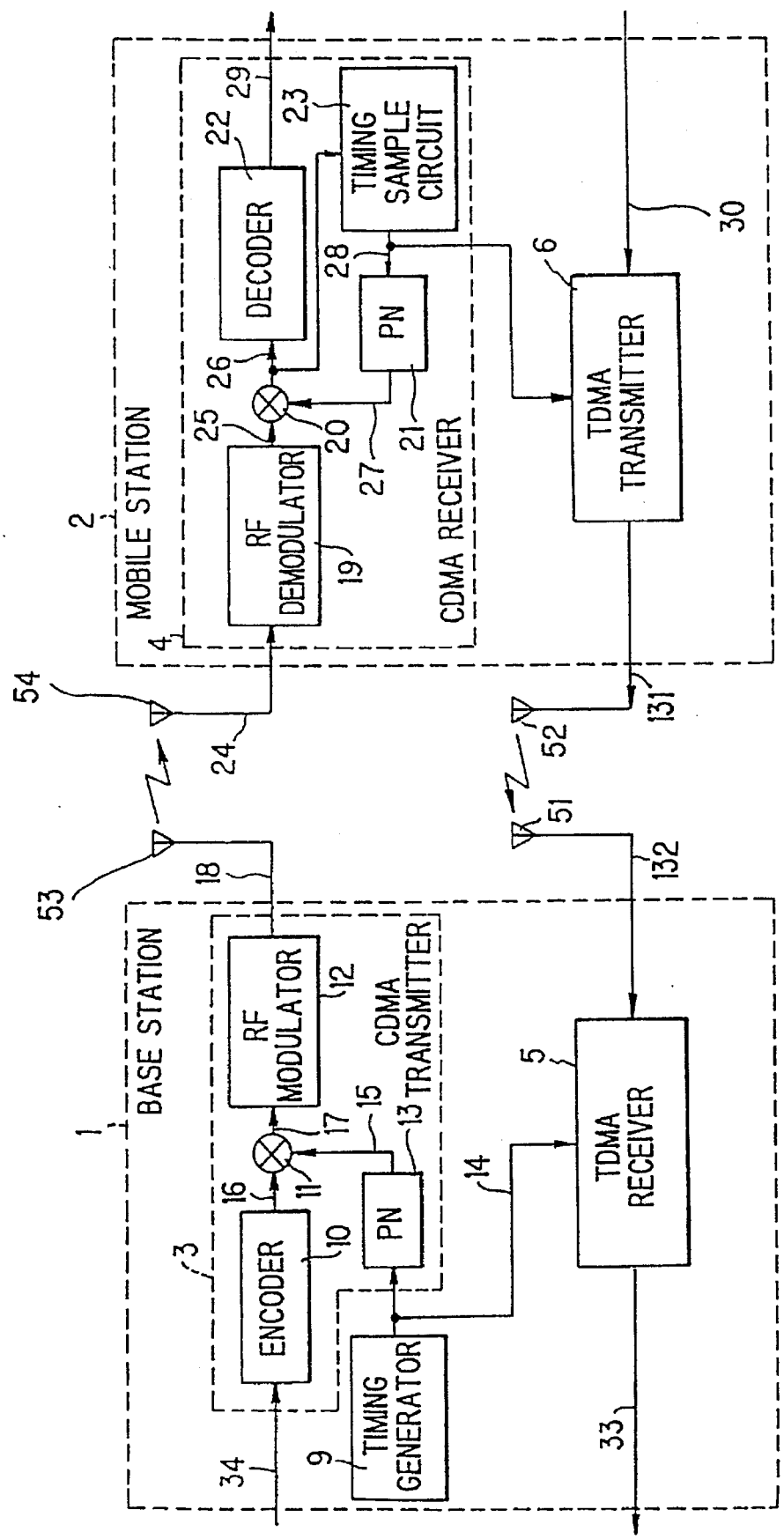
FIG. 3 is a block diagram showing digital mobile radio communication system in a preferred embodiment according to the invention.

FIG. 3 shows the digital mobile radio communication system which comprises a base station 1 comprising a CDMA transmitter 3, a TDMA receiver, and a timing generator 9, and a mobile station 2 comprising a CDMA receiver 4 and a TDMA transmitter 6.

The CDMA transmitter 3 of the base station 1 comprises an encoder 10 for generating a code signal 16 by encoding a base station transmitting data signal 34, a multiplier 11 for generating a spread spectrum signal 17 by spectrum-spreading the code signal 16, a RF modulator 12 for modulating a high frequency signal by the spread spectrum signal 17 to provide a base station high frequency transmitting signal 18, and a spread spectrum code (pseudo noise) generator 13 for generating a spread spectrum code signal 15 to be used in the execution of spread spectrum by the multiplier.

The CDMA receiver 4 of the mobile station 2 comprises a RF demodulator 19 for demodulating a mobile station received high frequency signal 24 based on the base station transmitting high frequency signal 18 to generate a demodulated signal 25, a multiplier 20 for generating a despread spectrum signal 26 by spectrum-despreading the demodulated signal 25, a decoder 22 for decoding the despread spectrum signal 26 to generate a mobile station received data signal 26, a despread spectrum code (pseudo noise) generator 21 for generating a despread spectrum code signal 27 to be used in the execution of despread spectrum, and a timing sample circuit 28 for generating a mobile station timing signal to optimize timing in operation of the despread spectrum code generator 21.

In operation, the base station transmitting data signal 34 is supplied to the encoder 10 of the CDMA transmitter 3 in the base station 1, and the code signal 16 is generated therein. The timing generator 9 generates a timing signal 14 (FIG. 4(a)) to be supplied to the spread spectrum code generator 13 in the base station 1. In accordance with the supply of the timing signal 14, the spread spectrum code generator 13 generates a periodical spread spectrum code signal 15 (FIG. 4(b)). The code signal 16 from the encoder 10 is supplied to the multiplier 11 to be the spread spectrum signal 17, by which a high frequency signal is modulated in the RF modulator 12 to provide the base station high frequency transmitting signal 18 of a continuous electric wave having no period (FIG. 4(c)).

In the mobile station, the transmitting signal 18 is received via the down line including antennas 53 and 54 by the RF demodulator 19, from which the demodulator signal 25 is supplied to the multiplier 20. Thus, the despread spectrum operation is carried out therein in accordance with the despread spectrum code signal 27 (FIG. 4(d)) form the despread spectrum code generator 21, so that the despread spectrum signal 26 is obtained to be supplied to the decoder 22, in which the decoding of the despread spectrum signal 26 is carried out to provide a mobile station received data signal 29.

A portion of the despread spectrum signal 26 is supplied to the timing sample circuit 23, in which a mobile station timing signal 28 (FIG. 4(e)) is determined in timing to optimize timing in operation of the despread spectrum code generator 21.

In the timing sample circuit 23, the despread spectrum signal 26 supplied from the multiplier 20 is checked as to whether a code signal is correctly obtained by changing the delay time of the despread spectrum code signal 27, so that the timing of the mobile station timing signal 28 is determined. That is, the spread spectrum signal 17 is generated in the base station by the multiplication of the encoded data signal 16 and the spread spectrum code signal (PN) 15 as defined below.

[SIGNAL 16]×[PN 15]=[SIGNAL 17]

The despread spectrum signal 26 equal to the encoded data signal 16 is obtained in the mobile station 2 by the multiplication of the demodulated signal 25 equal to the spread spectrum signal 17 and the despread spectrum code signal (PN) 27 equal to the spread spectrum code signal (PN) 15 as defined below.

[SIGNAL 25][PN 27]=[SIGNAL 26]

Here, if the generation timing of the PN 27 is controlled to be synchronous with the signal 25 by the timing sample circuit 23, the encoded data signal is obtained in the despread spectrum signal 26, because the multiplication result of the PN 17 and the PN 27 becomes 1.

Thus, the mobile station timing signal 28 is determined in timing in accordance with the delay time (FIG. 4(d) and FIG. 4(e)). The mobile station timing signal 28 thus determined is also supplied to the TDMA transmitter 6, in which a mobile station high frequency transmitting signal 131 (FIG. 4(f)) is generated in the elapse of a time $T_{s1}$ prescribed in the system from the timing of the mobile station timing signal 28, and is transmitted via the down line including antennas 52 and 51 to the base station 1. Thus, the high frequency transmitted signal 132 (FIG. 4(g)) is received in the TDMA receiver 5 of the base station 1, wherein the synchronism is set up in accordance with the base station timing signal 14 and a time $T_{s2}$ prescribed in the system.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A digital mobile radio communication system, comprising:

a base station comprising a CDMA transmitter for transmitting a spread spectrum signal, a TDMA receiver for receiving a TDMA transmitted signal, and a timing generator for generating a base station timing signal; and a plurality of mobile stations each coupled via a down line and a up line to said base station, each of said mobile stations comprising a CDMA receiver for receiving said spread spectrum signal via said down line from said base station, a TDMA transmitter for transmitting a TDMA transmitting signal via said up line to said base station;

wherein said CDMA receiver comprises means for generating a mobile station timing signal in accordance with a despread spectrum signal obtained from said spread spectrum signal received in said CDMA receiver; and said TDMA transmitter operates in accordance with said mobile station timing signal.

2. A digital mobile radio communication system, according to claim 1, wherein:

said CDMA transmitter comprises an encoder for encoding a transmitting data to provide a transmitting code signal, means for generating a spread spectrum code signal, a multiplier for multiplying said transmitting code signal and said spread spectrum code signal to provide said spread spectrum signal, and a RF modulator for modulating a high frequency signal by said spread spectrum signal to provide a base station high frequency transmitting signal; and said CDMA receiver comprises a RF demodulator for demodulating a mobile station received signal obtained by receiving said base station high frequency transmitting signal to provide a demodulated signal, means for generating a despread spectrum code signal, a multiplier for multiplying said demodulated signal and said despread spectrum code signal to provide a despread spectrum signal, and a decoder for decoding said despread spectrum signal to provide a received data, said despread spectrum code signal generating means being controlled in signal generating timing by said base station timing signal.

* * * * *